United States Patent [19]

Sundararaman et al.

[11] Patent Number: 5,116,922

[45] Date of Patent: May 26, 1992

[54] POLYMERS CONTAINING BETA-HYDROXYALKYLAMIDE GROUPS

[75] Inventors: Padmanabhan Sundararaman, Allison Park; Rudolf Maska; Cynthia L. Verardi, both of Pittsburgh, all of Pa.

[73] Assignee: PPG Industries, Inc., Pittsburgh, Pa.

[21] Appl. No.: 770,491

[22] Filed: Oct. 3, 1991

[51] Int. Cl.$^5$ .................. C08F 20/58; C08L 51/00; C08L 51/08

[52] U.S. Cl. .................. 526/304; 525/63; 525/64

[58] Field of Search .................. 526/304

[56] References Cited

U.S. PATENT DOCUMENTS

| | | | |
|---|---|---|---|
| 4,076,917 | 2/1978 | Swift et al. | 526/49 |
| 4,101,606 | 7/1978 | Cenci et al. | 260/857 |
| 4,115,637 | 9/1978 | Cenci et al. | 526/56 |
| 4,138,541 | 2/1979 | Cenci et al. | 526/383 |
| 4,528,320 | 7/1985 | Ley et al. | 524/555 |
| 4,530,960 | 7/1985 | Ley et al. | 524/555 |
| 4,656,308 | 4/1987 | Schirmann et al. | 560/170 |
| 4,755,623 | 7/1988 | Dileone | 564/160 |
| 4,918,139 | 4/1990 | Cuirassier et al. | 524/813 |

Primary Examiner—Joseph L. Schofer
Assistant Examiner—Wu C. Cheng
Attorney, Agent, or Firm—William J. Uhl

[57] ABSTRACT

Polymers containing one or more groups of the formula:

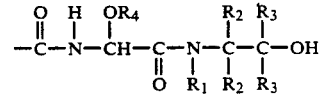

where $R_4$ is alkyl having 1 to 6 carbon atoms, cycloalkyl of 5 to 6 carbon atoms and hydroxyalkyl of 2 to 6 carbon atoms; $R_1$ is hydrogen, alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of the $R_2$ and one of the $R_3$ radicals joined together with the carbon atom to which they are attached to form cycloalkyl. The polymers can be made self-curing or can be combined with a co-reactable second material containing functional groups selected from hydroxyl, carboxylic acid, carboxylic acid anhydride and isocyanate to form curable compositions. The self-curable polymers and the curable polymer compositions are useful as resinous film formers in coating compositions which can be cured without the generation of formaldehyde.

9 Claims, No Drawings

POLYMERS CONTAINING BETA-HYDROXYALKYLAMIDE GROUPS

CROSS REFERENCE TO RELATED APPLICATION

Reference is made to Application Ser. No. 07/770,397, filed even date herewith, which discloses oligomers formed from reacting alkyl acrylamidoglycolate alkyl ethers with beta-hydroxyalkylamines.

BACKGROUND OF THE INVENTION

1. Field of the Invention:

The present invention relates to polymers which contain reactive functional groups enabling them to be self-reactive or reactive with other materials containing co-reactable groups.

2. Brief Description of the Prior Art:

Polymers containing reactive groups such as active hydrogen groups, particularly hydroxyl and carboxylic acid, are reactive with other materials containing N-methylol or N-alkoxymethyl groups to form curable compositions. Unfortunately, compositions containing these materials when cured generate formaldehyde which is an undesirable by-product.

Curable compositions based on materials containing hydroxyalkylamide groups which are curable with polycarboxylic acids and polycarboxylic acid anhydrides are known in the prior art. See, for example, U.S. Pat. Nos. 4,076,917; 4,101,606; 4,115,637 and 4,138,541. These compositions are curable without the generation of free formaldehyde.

Polymers based on active ester groups derived from alkyl acrylamidoglycolate alkyl ethers are known in the art. See, for example, U.S. Pat. Nos. 4,528,320; 4,530,960; 4,656,308 and 4,755,623. Such polymers are curable with amines. Also, these polymers are self-curable or are curable by reaction with materials containing hydroxyl or carboxyl functionalities. Such materials, when they cure, also do not generate free formaldehyde.

SUMMARY OF THE INVENTION

In accordance with the present invention, a polymer containing one or more pendant groups of the formula:

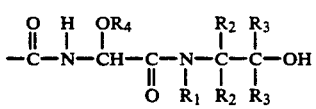

is provided. In the above structure, $R_4$ is alkyl having 1 to 6 carbon atoms, cycloalkyl of 5 to 6 carbon atoms and hydroxyalkyl of 2 to 6 carbon atoms; $R_1$ is hydrogen, alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of the $R_2$ and one of the $R_3$ radicals joined together with the carbon atom to which they are attached form a cycloalkyl radical. The polymer is self-curable or it can be combined with another material containing one or more functional groups selected from hydroxyl, carboxylic acid, carboxylic acid anhydride and isocyanate to form a curable composition.

DETAILED DESCRIPTION

The polymers of the present invention can be prepared by reaction of a polymer having one or more pendant groups of the structure:

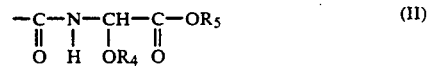

wherein $R_4$ and $R_5$ are the same or different radicals selected from alkyl containing 1 to 6 carbon atoms, cycloalkyl of 5 to 6 carbon atoms and hydroxyalkyl of 2 to 6 carbon atoms, with an alkanolamine of the structure:

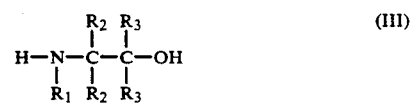

where $R_1$ is hydrogen, lower alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of the $R_2$ and one of the $R_3$ radicals joined together with the carbon atom to which they are attached to form cycloalkyl, typically of five to six carbon atoms.

The polymer having the structural units set forth in (I) above typically contains up to about 95 percent, preferably 20 to 70 percent by weight of the structural units; the percentage by weight being determined by dividing the weight of the polymer attributed to the structural unit (I) by the total weight of the polymer. The polymers typically have molecular weights of 5000 to 100,000 on a weight average basis with the molecular weight being determined by gel permeation chromatography using a polystyrene standard.

Examples of polymers having one or more pendant groups of the structure (II) are vinyl addition polymers in which vinyl monomers of the structure:

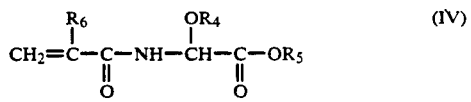

in which $R_6$ is selected from hydrogen and methyl and $R_4$ and $R_5$ are as described above, are homopolymerized or copolymerized with other vinyl monomers.

Examples of vinyl monomer of the structure (IV) include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Mixtures of such monomers can be used. The monomer (IV) can constitute up to 100 percent by weight of the total weight of vinyl monomer used in preparing the polymer (I). Preferably, the monomer (IV) is used in amounts of 10 to 80 percent by weight, more preferably 20 to 70 percent by weight.

The monomers of the above structure (IV) may be homopolymerized or copolymerized with other vinyl monomers according to conventional organic solution vinyl polymerization techniques using conventional initiators, temperatures and reaction conditions. Suitable comonomers include the acrylates, methacrylates, styrenes, acrylonitriles, vinyl ethers and vinyl esters. Specifically useful are alkyl acrylates and methacrylates wherein the alkyl groups have 1–18 carbon atoms such as methyl methacrylate, ethyl acrylate, propyl acrylate, butyl acrylate, 2-ethylhexyl acrylate, ethyl methacrylate and butyl methacrylate. Examples of other comonomers are styrene, alpha-methylstyrene, acrylonitrile, methacrylonitrile, methyl vinyl ether and vinyl acetate. These other vinyl monomers when used are preferably present in amounts of 10 to 85, more preferably 20 to 70 percent by weight based on total weight of vinyl monomers used in preparing the polymer (I).

Also, monomers containing co-reactive functional groups as described in more detail below can also be used.

Generally, the polymerization or copolymerization is performed in the presence of an inert organic solvent such as ethyl acetate, methyl ethyl ketone or tetrahydrofuran and the like so that the resultant polymer is ready for use in a coating.

As mentioned above, the polymer having one or more groups of the structure (II) is reacted with an alkanolamine (III). Typically, the alkanolamine is added slowly to a solution of the polymer with cooling to control any exotherm. After addition is complete, the reaction mixture is heated at reflux and the alcohol by-product removed by distillation.

Examples of suitable alkanolamines include 2-aminoethanol; 2-methylaminoethanol; 2-ethylaminoethanol; 2-n-propylaminoethanol; 2,2′-iminodiethanol; 2-aminopropanol; 2,2′-iminodiisopropanol; 2-aminocyclohexanol; 2-aminocyclopentanol; 2-aminomethyl-2-methylethanol; 2-n-butylaminoethanol; 2-methylamino-1,2-dimethylethanol; 2-amino-2-methyl-1-propanol; 2-amino-2-methyl-1,3-propanediol; 2-amino-2-ethyl-1,3-propanediol and 2-amino-2-hydroxymethyl-1,3-propanediol.

The amount of alkanolamine which is reacted with the polymer is on an equivalent basis, typically from about 0.1 to 1 equivalent (based on amine) of alkanolamine for each equivalent (based on

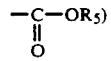

of polymer.

Although the polymers of the present invention are self-curing, additional co-reactive functional groups can be incorporated into the polymer or can be present as a second component. Examples of such co-reactive functional groups are hydroxyl groups, carboxylic acid groups, carboxylic anhydride groups and isocyanate groups. Such groups can be incorporated into the polymer backbone by polymerizing with appropriate functional group-containing vinyl monomers.

Examples of suitable functional group-containing vinyl monomers include hydroxyl group-containing monomers such as hydroxyalkyl acrylates and hydroxyalkyl methacrylates, specifically, hydroxypropyl acrylate and hydroxyethyl methacrylate; carboxylic acid group-containing monomers such as acrylic acid and methacrylic acid; anhydride group-containing vinyl monomers such as maleic anhydride and itaconic anhydride and isocyanate group-containing vinyl monomers such as isocyanatoethyl methacrylate and α,α-dimethyl-m-isopropenyl benzyl isocyanate (m-TMI). So as to prevent premature reaction with any available active hydrogens in the polymerizing mixture, the isocyanate should be blocked with a material such as an alcohol, ketoxime, caprolactam or other blocking agents well known in the art in which the blocked isocyanate will remain stable during polymerization but will unblock at curing temperature. The amount of the polymerizable monomer containing the desired functional group, when used, is preferably present in amounts of 5 to 50, more preferably from about 10 to 30 percent by weight based on total weight of the vinyl monomers used in preparing the polymer (I).

The co-reactive functional groups mentioned above can also be present as a separate component which is different from polymer (I). The component can be a monomer, oligomer or polymer. Examples of suitable separate components which contain co-reactable functional groups are polyols, polycarboxylic acids, polycarboxylic anhydrides and polyisocyanates. These materials can have molecular weights as low as 62 to as high as 100,000 with the molecular weights of the polymers being on a weight average basis, determined by gas chromatography using a polystyrene standard.

The polyols can have hydroxyl values between about 1,500 and 10, preferably between 500 and 50. The polyols include low molecular weight diols and triols and higher alcohols, higher molecular weight polymeric polyols such as polyester polyols and hydroxyl group-containing acrylic polymers. The low molecular weight diols, triols and higher alcohols can have hydroxyl values of 200 or above, usually within the range of 1,500 to 200. Such materials include aliphatic polyols, particularly alkylene polyols containing from 2 to 18 carbon atoms. Examples include ethylene glycol and 1,4-butanediol, trimethylolpropane and pentaerythritol and cycloaliphatic polyols such as 1,2-cyclohexanediol and cyclohexanedimethanol.

Polyester polyols which can be used as the polyol component can be prepared by the polyesterification of an organic polycarboxylic acid or anhydride thereof with organic polyols in which the OH/COOH ratio is greater than 1. Usually, the polycarboxylic acids and polyols are aliphatic or aromatic dibasic acids and diols.

The diols which are usually employed in making the polyester include alkylene glycols, such as ethylene glycol and neopentyl glycol. Polyols of higher functionality can also be used. Examples include trimethylolpropane and pentaerythritol.

The acid component of the polyester consists primarily of monomeric carboxylic acids or anhydrides having 2 to 18 carbon atoms per molecule. Among the acids which are useful are phthalic acid, terephthalic acid, adipic acid, azelaic acid and dodecanoic acid. Also, there may be employed higher polycarboxylic acids such as trimellitic acid. Where acids are referred to above, it is understood that anhydrides of those acids which form anhydrides can be used in place of the acid. Also, lower alkyl esters of the acids such as dimethyl terephthalate can be used.

In addition to polyester polyols, hydroxy-containing acrylic polymers or acrylic polyols can be used as the polyol component.

Among the acrylic polymers are interpolymers of about 0.2 to 10 percent by weight hydroxy-containing vinyl monomers such as hydroxyalkyl acrylates and methacrylates such as those mentioned above in connection with the preparation of the polymer (I) and 90 to 99.8 percent by weight of other ethylenically unsaturated copolymerizable materials such as the non-functional monomers mentioned above which are copolymerizable with the vinyl monomer (IV); the percentages by weight being based on the total weight of the vinyl monomers used in preparing the acrylic polyol. The acrylic polyols can be prepared by conventional solution vinyl polymerization techniques.

Examples of suitable polycarboxylic acids or polycarboxylic anhydrides include aliphatic polycarboxylic acids and aromatic polycarboxylic acids. Representative examples would be adipic acid, sebacic acid, azelaic acid, succinic acid, phthalic acid, tetrahydrophthalic acid, hexahydrophthalic acid, maleic acid, fumaric acid, citraconic acid and itaconic acid. Also, anhydrides of such acids where they exist can be used.

In addition to the monomeric polycarboxylic acids and anhydrides as mentioned above, oligomeric and polymeric polycarboxylic acids and anhydrides can also be used. Examples would include carboxylic acid group-containing polyester oligomers and polymers and carboxylic acid group and anhydride group-containing acrylic polymers. The carboxylic acid group-containing polyester oligomers and polymers can be formed from reacting an organic monomeric polyol or polymeric polyol with a 1,2-dicarboxylic acid anhydride under conditions sufficient to ring open the anhydride forming the half-ester with substantially no polyesterification occurring. Examples of suitable monomeric polyols are alkylene polyols such as ethylene glycol, neopentyl glycol and trimethylolpropane. Examples of suitable polymeric polyols are the polyester polyols described above. Examples of suitable 1,2-dicarboxylic anhydrides include aliphatic and aromatic anhydrides such as succinic anhydride and phthalic anhydride.

The carboxylic acid and the carboxylic acid anhydride group-containing acrylic polymer can be prepared by polymerizing 0.2 to 10 percent by weight of an acid and/or anhydride group-containing acrylic monomer such as acrylic acid, methacrylic acid, maleic anhydride or itaconic anhydride with 90 to 99.8 percent by weight of another copolymerizable vinyl monomer such as the non-functional monomers mentioned above which are copolymerizable with the vinyl monomer (IV); the percentages by weight being based on total weight of vinyl monomers used in preparing the carboxylic acid and/or anhydride group-containing acrylic polymer.

Examples of suitable polyisocyanates include aliphatic or aromatic polyisocyanate or mixtures thereof. Examples of suitable aromatic polyisocyanates are 4,4'-diphenylmethane diisocyanate, toluene diisocyanate and polymethylene polyphenyl isocyanate. Examples of suitable aliphatic polyisocyanates are 1,4-tetramethylene diisocyanate and 1,6-hexamethylene diisocyanate. Also, isocyanate dimers and trimers can be used such as the biuret or isocyanurate of 1,6-hexamethylene diisocyanate. Cycloaliphatic polyisocyanates can be used such as 4,4'-methylenebis(cyclohexyl isocyanate). Isocyanate prepolymers such as are obtained by reacting active hydrogen-containing compounds with a stoichiometric excess of an organic polyisocyanate such as those described above can also be used. Examples of such active hydrogen-containing materials are polyhydroxyl group-containing materials or polyols having two or more hydroxyl groups per molecule such as those described above in connection with the polyol component. The isocyanate can be free or blocked as described above. Blocked isocyanates enable the formation of one-component systems.

The amount of the polyol, polycarboxylic acid, anhydride or polyisocyanate which is used will be dependent upon whether the co-reactable functional group is contained in the polymer or present as a separate component and the separate component is a monomer, oligomer or polymer and the functional group equivalent weight of the material. In general, for hydroxyl functional groups, the equivalent ratio of OH to the

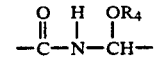

group is within the range of 0.1 to 2:1. For carboxylic acid and anhydride, the equivalent ratio of carboxylic acid or anhydride to hydroxyl is from 0.1 to 2:1. In the above calculations, anhydride is considered to be difunctional. For isocyanates, the equivalent ratio of isocyanate to hydroxyl is from 0.1 to 1:1 and the final cured product is substantially free of unreacted isocyanate functionality.

The polymers (I) of the present invention either as self-curing polymers or in combination with separate components containing co-reactive functional groups are useful as film formers in coating compositions. They can be used either with organic solvent or with water to form organic solvent-borne or water-borne systems, respectively. Solvents which may be employed include aromatics such as toluene, xylene and the like, aliphatics such as heptane, octane and the like. Also, polar solvents such as water, dimethylformamide, dimethylsulfoxide and hydrogenated solvents such as ethers, esters and alcohols may be used depending upon the solubility of the particular polymer. Aqueous compositions can be prepared from salts of carboxylic group-containing compositions, for example, amine salts. Typically, the polymer (I) either as a self-curing polymer or in combination with separate components containing co-reactive functional groups can be present in amounts of about 5 to 95, more typically 30 to 80 percent by weight based on total weight of the composition.

The coating compositions may contain other ingredients which are customarily employed including ingredients such as catalysts, pigments, flow additives, surfactants and other resinous materials.

The coating compositions can be used as general purpose industrial coatings and varnishes, machinery and equipment coatings, especially metal coatings such as for containers, appliances, automobiles and the like. In addition, the reactive compositions can be used for forming films, paints, lacquers, varnishes, caulks, impregnants and adhesives for both natural and synthetic materials such as paper, textiles, wood, plastics, metal and leather and in areas where compositions based on aminoplast curing agents are presently employed.

When the compositions of the invention are applied as coatings, they are typically cured over the temperature range of 250° to 400° F. (121° to 204° C.) for 30 seconds to 60 minutes. The composition can be applied by any conventional coating means such as brushing, spraying, dipping or roll coating.

WORKING EXAMPLES

The following examples show the preparation of polymers containing activated ether and beta-hydroxyalkylamide groups; the formulation of reactive compositions containing these polymers and the application of the compositions to metal substrates to form coatings.

In the examples, all parts and percentages are by weight unless otherwise specified. It should be appreciated that the examples are illustrative only and it will be apparent to those skilled in the art that other polymers containing activated ether groups and beta-hydroxyalkylamide groups may be employed in an analogous manner to form reactive compositions and coating compositions based thereon.

EXAMPLE I

This example shows the preparation of a polymer containing activated ether and beta-hydroxyalkylamide groups formed from reacting a vinyl copolymer containing an amidoglycolate methyl ether group with diethanolamine. The polymer containing the amidoglycolate methyl ether group was prepared as follows:

To a five-liter round-bottom flask equipped with a heating mantle, condenser, thermometer, stirrer and two graduated addition cylinders were added at room temperature 112.5 grams of ethylethoxypropionate, 13.5 grams of t-dodecylmercaptan, 13.5 grams of t-amylperoxy-2-ethylhexanoate, free radical initiator available from Atochem North America Inc. as LUPERSOL 575, and 150 grams of a vinyl monomer charge described below.

These ingredients were heated to reflux at 135° C. under a nitrogen atmosphere, then the nitrogen atmosphere was turned off and the rest of the vinyl monomer charge and an initiator charge also described below were added simultaneously over a three hour period.

The vinyl monomer charge consisted of 675 grams of methyl acrylamidoglycolate methyl ether, 337.5 grams of styrene, 337 grams of methyl methacrylate, 40.5 grams of tertiary dodecyl mercaptan and 670 grams of n-butanol.

The initiator charge consisted of 75 grams of ethylethoxypropionate and 54 grams of LUPERSOL 575.

After the additions were completed, 22.5 grams of ethylethoxypropionate were added as a rinse for the vinyl monomer charge, then a second initiator charge was added consisting of 11.3 grams of ethylethoxypropionate and 16.9 grams of LUPERSOL 575. The reaction mixture was held for 90 minutes at 120° C. followed by cooling to 78° C. and the addition over a 10-minute period of 491.6 grams of diethanolamine. The reaction mixture was held at 78° C. for 15 minutes and then cooled to room temperature. The final polymeric reaction product had a solids content of 64.9 percent, contained 0.419 milliequivalents of base and the polymer had a weight average molecular weight of 7702.

EXAMPLES IIA-IIM

The polymer described in Example I was combined with a carboxylic acid group-containing acrylic polymer in various equivalent ratios reported in Table I below to form a reactive composition and the combination drawn down over a steel substrate at various thicknesses and cured at the various temperatures reported in Table I below.

For the purposes of control, the polymer of Example I by itself and the carboxylic acid group-containing polymer by itself each were drawn down as a coating and heated in the manner set forth in Table I below.

Table I also reports the physical properties of the resultant coatings.

The carboxylic acid group-containing acrylic polymer used in the examples comprised 70 percent styrene, 29 percent acrylic acid, 1 percent ethyl acrylate and was prepared by conventional organic solution polymerization techniques, neutralized to fifty (50) percent total theoretical neutralization with ammonia and dispersed in a mixture of 86.6 percent by weight water and 13.4 percent by weight butanol.

TABLE I

Evaluation for Cure Response of Coatings Prepared From The Polymer of Example I With and Without A Carboxylic Acid Group-Containing Acrylic Polymer

| Example | Polymer of Example I | Carboxylic Acid Group-Containing Polymer | Equivalent Ratio | DFT[1] (mils) | Bake Schedule (minutes/°F.) | Pencil Hardness[2] | MEK Double Rubs[3] | Yellowing[4] |
|---|---|---|---|---|---|---|---|---|
| IIA | yes | yes | 1:2 | 0.63 | 30/275 | >4H | >100 | 2 |
| IIB | yes | yes | 1:2 | 1.5 | 30/275 | H | >100 | 10 |
| IIC | yes | yes | 1:4 | 0.66 | 30/275 | >4H | >100 | 2 |
| IID (Comparative) | no | yes | — | 0.65 | 30/275 | ND[5] | 15 | 0 |
| IIE (Comparative) | no | yes | — | 1.30 | 30/275 | ND[5] | 16 | 0 |
| IIF | yes[6] | no | — | 0.60 | 20/350 | 4H | >100 | 6 |
| IIG | yes[6] | no | — | 1.16 | 20/350 | 2H | >100 | 6 |
| IIH | yes[6] | no | — | 0.65 | 20/300 | H | 55 | 2 |
| IIJ | yes[6] | no | — | 1.42 | 20/300 | H | >100 | 2 |
| IIK | yes[6] | no | — | 0.76 | 20/250 | HB | 40 | 2 |
| IIL | yes[6] | no | — | 1.32 | 20/250 | HB | 25 | 2 |
| IIM | yes | no | — | 1.72 | 20/250 | HB | 85 | — |

[1]DFT = dry film thickness.
[2]Pencil Hardness is determined by taking pencils of increasing hardness and attempting to etch the coating. The softest pencil which will etch the coating is reported.
[3]MED Double Rubs involve rubbing a coated panel with a methyl ethyl ketone saturated cloth in a back and forth motion (double rub) with firm hands pressure. The number of double rubs required to remove the coating from the substrate is reported.
[4]Yellowing was determined on the scale of 0–10 with 0 being no yellowing, 2 slight yellowing, 6 moderate yellowing and 10 heavy yellowing.
[5]ND = not determined.
[6]Polymer of Example I in combination with 1 percent by weight based on solids of para-toluene sulfonic acid catalyst.

EXAMPLES IIIA-IIIC

The polymer as generally described in Example I was combined with a blocked isocyanate curing agent at various levels and the combination thinned with organic solvent to give a 54–57 percent by weight resin solids mixture. The mixture was drawn down over a steel substrate (DFT=0.7–0.8 mil) and cured at 35–40 seconds in an oven to reach a peak metal temperature of 450°–460° F. For the purposes of the comparison, the polymer of Example I by itself was also evaluated under these conditions. The physical properties for these examples are reported in Table II below.

TABLE II

Physical Properties of Cured Coatings Derived From Polymer of Example I and Blocked Isocyanate Curing Agents

| Example No. | Percentage by Weight Polymer of Example I | Percentage by Weight Blocked Isocyanate[1] | Pencil Hardness | MEK Double Rubs | Comment |
|---|---|---|---|---|---|
| IIIA | 90 | 10 | 3B | 85 | yellow |
| IIIB | 80 | 20 | 2H | >100 | yellow |
| IIIC | 100 | 0 | 5B | 9 | — |

[1]The blocked isocyanate was the isocyanurate of 1,6-hexamethylene diisocyanate blocked with methyl ethyl ketoxime available from Mobay Corporation as DESMODUR BL 3175.

EXAMPLE IV

This example shows the formulation of a varnish with the polymer of Example I and a carboxylic acid group-containing acrylic polymer and the application of the varnish to aluminum can stock to which was previously applied an uncured ink layer.

The varnish was formulated with 48.19 grams (31.27 grams solids) of the polymer of Example I and 125 grams (50 grams solids) of the carboxylic acid group-containing acrylic polymer described below and 3.25 grams (0.81 grams solids) of a silicon surfactant available as SILWET L7605 from Union Carbide Corporation, diluted to 25 percent solids content with 2-hexoxyethanol. The varnish was drawn down over the uncured ink layer (wet on wet application). The varnish and link were then simultaneously cured first for 90 seconds at 400° F. (204° C.), followed by 3 minutes at 400° F. (204° C.). The resultant coating had a pencil hardness of 5H, withstood 100 methyl ethyl ketone double rubs, exhibited good flow and very good ink wetting and was only very slightly yellowed. When the example was repeated but without the silicon surfactant, the varnish had very poor ink wetting, i.e., the coating agglomerated on the ink layer exposing large unvarnished areas, and was slightly yellowed.

The carboxylic acid group-containing acrylic polymer used in this example was prepared by solution polymerization techniques in the presence of wax according to the procedures described in U.S. 5,034,454 and specifically was prepared from 74.7 percent methyl methacrylate, 20 percent acrylic acid, 5.1 percent styrene and 0.2 percent glycidyl methacrylate; the percentages by weight being based on total weight of monomers. The polymer was neutralized with dimethylethanolamine, 100 percent total theoretical neutralization, and dispersed in water, solids content 40 percent by weight.

We claim:

1. A polymer containing one or more groups of the formula:

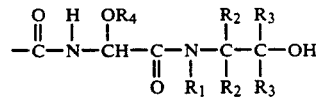

where $R_4$ is alkyl having 1 to 6 carbon atoms, cycloalkyl of 5 to 6 carbon atoms and hydroxyalkyl of 2 to 6 carbon atoms; $R_1$ is hydrogen, alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of the $R_2$ and one of the $R_3$ radicals joined together with the carbon atom to which they are attached to form cycloalkyl.

2. The polymer of claim 1 in which $R_4$ is methyl.

3. The polymer of claim 1 in which $R_2$ is hydrogen and $R_3$ is selected from hydrogen and alkyl having 1 to 5 carbon atoms.

4. The polymer of claim 1 in which $R_1$ is hydroxyalkyl having 1 to 5 carbon atoms.

5. The polymer of claim 1 in which $R_1$ is hydroxyethyl and $R_2$ and $R_3$ are hydrogen.

6. The polymer of claim 1 in combination with another material containing functional groups selected from hydroxyl, carboxylic acid, carboxylic acid anhydride and polyisocyanate.

7. The combination of claim 6 in which the other material is a monomer, oligomer or second polymer.

8. The polymer of claim 1 which is a vinyl addition polymer.

9. The polymer of claim 1 in combination with a carboxylic acid group-containing acrylic polymer.

* * * * *